M. HARDSOCG.
DRILL.
APPLICATION FILED MAY 7, 1908.
923,514. Patented June 1, 1909.
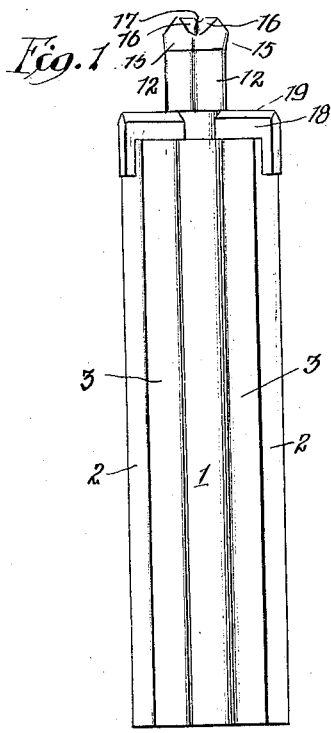
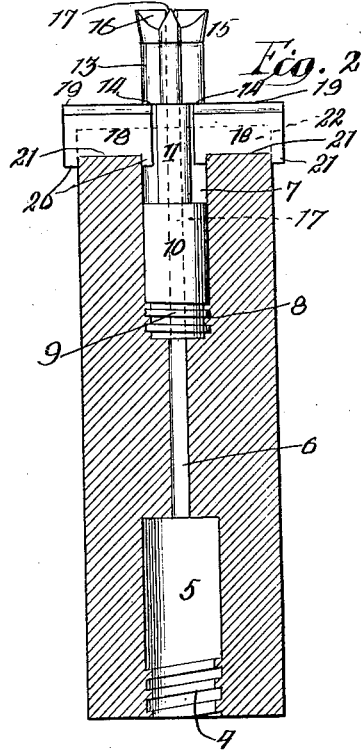
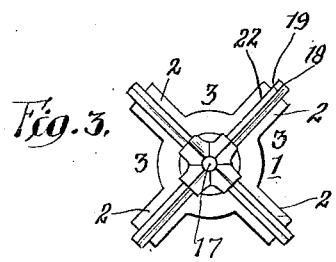
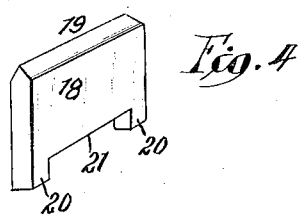
Witnesses:
Wm P. Bond
Pierson W. Banning
Inventor:
Martin Hardsocg
by Banning & Banning
Attys.

UNITED STATES PATENT OFFICE.

MARTIN HARDSOCG, OF OTTUMWA, IOWA.

DRILL.

No. 923,514.

Specification of Letters Patent.

Patented June 1, 1909.

Application filed May 7, 1908. Serial No. 431,457.

*To all whom it may concern:*

Be it known that I, MARTIN HARDSOCG, a citizen of the United States, residing at Ottumwa, in the county of Wapello and State of Iowa, have invented certain new and useful Improvements in Drills, of which the following is a specification.

Drills, for use in mines and other places, require, among other features of construction, that the cuttings, dust and dirt be removed from the hole or bore so as to maintain the bits or cutters clear for drilling, and for this purpose the drill head should have a construction by which a medium under pressure can be discharged at the bits or cutters to remove, with the return of the medium under pressure, the cuttings, dust and dirt; the drill should have a construction of the head by which overlapping holes can be produced, if so desired, by the bits or cutters, and for this purpose a center or lead drill is utilized in the present invention; and in order to obtain a longer life for the drill, as regards the bits or cutters, the bits or cutters should be removably attached to the head.

The object of the present invention is to construct a drill head with bits or cutters and a center or lead bit, and adapted to supply a medium under pressure at the acting end of the drill, and also to give a positive bearing point for maintaining the lead of the drill in a straight line in boring overlapping holes, and have the bits or cutters detachable from the drill head and capable of being reversed, and by reversing furnish a new cutting edge for the bits or cutters.

The invention consists in the features of construction and combinations of parts hereinafter described and pointed out in the claims as new.

In the drawings Figure 1 is a side elevation of the drill, with the several elements entering into its construction assembled ready for use; Fig. 2 a sectional elevation of the drill shown in Fig. 1; Fig. 3 an end elevation of the drill shown in Fig. 1; and Fig. 4 a detail in perspective of a detachable bit or cutter.

The head of the drill is made of steel or other suitable material, and in the form shown consists of a center 1 and four radiating wings 2, with the wings separated, one from the other, by grooves or channels 3, which furnish a clearance between the wings, for the removal of the cuttings, dust and dirt produced in the drilling operation.

The base or rear end of the drill has a threaded hole 4, for the attachment of the drill to the end of a drill rod, as usual, and continuing from the threaded hole 4 is a chamber or passage 5 to furnish an engagement for the end of the drill rod. A passage 6 leads forwardly from the terminal of the chamber or passage 5, and opens into the bottom of a hole or passage 7, the wall of which, at the bottom or lower end, has a screw thread 8, which receives the threaded end of a drill stem or stock 10, which stem or stock has a continuation or neck 11 between which and the wall of the hole or passage 7 is a clearance. The forward or acting end of the drill stem or stock has a head formed of a plurality of wings or flanges 12, with grooves or channels 13 between the wings or flanges, so as to furnish a passage for the cuttings, dust and dirt made by the operation of the acting end of the center or lead drill. The wings 12 of the head of the center or lead drill overhang the neck 11 of the stem or stock of the drill, so as to furnish shoulders or abutments 14, one for each wing or flange. Each wing or flange 12, in the construction shown, at the acting end of the center or lead drill, is spread outwardly so as to form a bead 15 each bead having, on opposite sides, an inclined face 16 to produce a cutting edge, making a center or lead bit with an acting end having four bits or cutters, which, however, operate as a single bit or cutter in use. A longitudinal passage or hole 17 extends through the stem or stock and the head of the center or lead bit or cutter, and is in communication with the passage 6, so as to discharge a medium under pressure in advance at the acting end of the center of the lead bit or cutter for the medium under pressure to return back through the passages 13 and the grooves or channels 3 of the main drill head, carrying with it the cuttings, dust and dirt produced by the operation of the center or lead bit or cutter and the main bit or cutter.

Each wing or flange 2 of the main drill head has attached thereto a blade or cutter, and each blade or cutter consists of a body 18 with a cutting edge 19, and at each end of the blade or cutter, on the bottom, is a lug 20, with a recess 21 between the lugs, as shown in Fig. 4. Each cutter has its body 18 entered into a slot 22 formed in the end of each wing, and extending across the wing and the end of the center or body 1 of the main drill head, with the recess 21 entered onto the end of the body and wing and the outer lug 20 engaging the exterior of the wing and the inner lug 20 engaging the face of the wall of the bore or passage 7, as shown in Fig. 2, so that each cutter or blade will be held in the recess therefor in the wing and body of the main drill head. The bits or cutters are held against forward movement by the engagement of the shoulders or abutments of the wings 12, with the inner end of each blade or cutter, as shown in Figs. 1 and 2; and in inserting the blades or cutters in position, the center or lead bit or cutter is entered partly into the hole or passage 7 therefor, so as to leave a clearance between the end face of the main drill head and the abutments or shoulders 14 for inserting the bodies 18 of the blades or cutters into the slots or recesses 22, and after the blades or cutters are thus placed in position the center or lead bit or cutter is threaded or otherwise fully entered into the main drill head for the shoulders or abutments 14 to engage the inner corner of the cutting edges of the blades or cutters, securing the blades or cutters firmly in place.

The main blades or cutters, when the outer corners or ends have become worn down so as not to be effective for drilling can be reversed to bring the unworn side or end of each blade or cutter to occupy an outer position, to do which it is only necessary to partially withdraw the center or lead drill or bit a distance sufficient to disengage the shoulders 14 from contact with the corners of the main cutters or bits, which will allow each main cutter or bit to be removed, and after removal each bit or cutter can be reversed and replaced by entering the body of each blade or cutter into the recess therefor in the end of the main drill head, and after reversing the bits or cutters can again be secured in place against forward movement or dropping out by again threading or advancing the center or lead bit or cutter for the shoulders 14 to engage the inner corners of the main bits or cutters. This construction enables the main blades or cutters to be securely held in place through the medium of the center or lead bit or drill, and this without in any manner interfering with the operation of the center or lead bit or drill as a drill.

In use, as the drill head, with the center or lead drill or bit in position, is advanced, the center or lead drill or bit will act first and bore a hole so that a guide and bearing for the main drill is furnished by the center or lead drill or bit, enabling the main cutters or blades to be maintained in an effective operative position and guided by the advance of the center or lead drill or bit in a direct line of cut. The center or lead drill not only performs a drilling operation but serves as a bearing and retaining point for the main drill head and its cutters or blades, by which the main drill head can be used and operated to drill overlapping holes, thus removing the material in a continuous line, by which the drill will make a clear cut enabling a block or section of material to be removed without the use of any other tool than the drill itself.

It will be understood that the blades or cutters of the main drill, instead of being removable, can be formed integral with the main drill head, and this without departing from the feature of construction in which a center or lead bit acts in advance of the main cutter or blade so as to furnish a bearing for setting and maintaining the main drill head and its bits or cutters in position to drill the overlapping holes, or otherwise.

The use of detachable blades or cutters enables a worn out blade or cutter to be removed to be thrown away and replaced by a new blade or cutter; and also enables a dull blade or cutter to be taken out and resharpened, either operation being easily performed by simply withdrawing the center or lead drill a sufficient distance to remove and replace the cutters or blades, and after replacing again advancing the center or lead drill into locking position. The center or lead drill can also be removed for resharpening or replacing a worn out drill or bit.

What I claim as new and desire to secure by Letters Patent is:

1. In a drill, the combination of a drill head having in its center a hole or passage, a center or lead drill having a neck of lesser diameter than the head of the drill and forming a shoulder in conjunction therewith, the neck being entered into the hole or passage, and a plurality of radially extending blades, each provided with a lug entered into the hole or passage in position to bring the outer edges of the blades into engagement with the shoulder for retaining the blades in place, substantially as described.

2. In a drill, the combination of a drill head having in its center a hole or passage, a center or lead drill having a neck of lesser diameter than the head of the drill and forming a shoulder in conjunction therewith, the neck being entered into the hole or passage, and a plurality of radially extending blades, each provided with inner and outer lugs, the inner lugs being entered into the hole or passage around the stem of the lead drill, and the outer lugs overhanging the body of the drill head, the blades being clamped in position by the engagement of the shoulder on the lead drill, substantially as described.

3. In a drill, the combination of a drill head consisting of a central body and a plurality of radial wings with channels between the wings, the drill head being provided with a central hole or passage, a lead drill forwardly extending from the drill head and having a neck entered into the hole or passage, an abutment being formed on the lead drill, and a plurality of radially extending blades on the wings, each having an inner lug entered into the hole or passage around the neck, the blades being clamped in position by the engagement of the abutment therewith, substantially as described.

4. In a drill, the combination of a drill head consisting of a central body and a plurality of radial wings with channels between the wings, the drill head being provided with a central hole or passage, a lead drill forwardly extending from the drill head and having a neck entered into the hole or passage, an abutment being formed on the lead drill, and a plurality of radially extending blades on the wings, each having an inner lug entered into the hole or passage around the neck, the blades being clamped in position by the engagement of the abutment therewith, and each of the blades being provided with an outer lug engaging the outer end of the radial wing upon which the blade is mounted, substantially as described.

5. In a drill, the combination of a drill head consisting of a central body and a plurality of radial wings with channels between the wings, each of the wings having in its end face a radially extending groove or channel, and the drill head having in its center a hole or passage, a plurality of blades positioned edgewise within the grooves or channels and having inner and outer lugs, the inner lugs being entered into the central hole or passage, and the outer lugs engaging the outer faces of the radial wings, and a central or lead drill having an enlarged head and a neck of reduced diameter affording a shoulder or abutment for engaging the inner ends of the blades and clamping the same in place, the lead drill being provided in its center with a port or passage, substantially as described.

MARTIN HARDSOCG.

Witnesses:
 W. A. WORK,
 ALTA GRAY.